United States Patent [19]

Florida et al.

[11] Patent Number: 5,060,694

[45] Date of Patent: Oct. 29, 1991

[54] FILLER SPOOL VALVE

[75] Inventors: William F. Florida; Jon G. Burke, both of Fresno, Calif.

[73] Assignee: FMC Corporation, Chicago, Ill.

[21] Appl. No.: 612,026

[22] Filed: Nov. 9, 1990

[51] Int. Cl.$^5$ .................... F16K 11/02; F16K 3/26
[52] U.S. Cl. ...................... 137/625.18; 137/625.48; 251/25
[58] Field of Search .............. 137/625.48, 625.68, 137/625.18, 625.19

[56] References Cited

U.S. PATENT DOCUMENTS

| | | | |
|---|---|---|---|
| 2,743,900 | 5/1956 | Holzer et al. | 137/625.48 X |
| 3,150,517 | 9/1964 | Kuffer et al. | 137/625.18 X |
| 3,282,651 | 11/1966 | Ferrari et al. | 137/625.19 X |
| 4,423,741 | 1/1984 | Levy | 137/625.48 X |
| 4,676,435 | 6/1987 | Nesland | 137/625.48 X |

FOREIGN PATENT DOCUMENTS 818705 8/1959 United Kingdom ......... 137/625.48

Primary Examiner—Arnold Rosenthal
Attorney, Agent, or Firm—A. J. Moore; R. C. Kamp; R. B. Megley

[57] ABSTRACT

A filler spool valve is disclosed having an open ended housing with an elongated cylindrical passage therethrough. A valve core having a plurality of evenly spaced arcuate and inline passages is reciprocated by a pneumatic cylinder connected thereto by a quick connect coupling to alternately cause a flowable product to flow along generally C-shaped passages, and thereafter linear passages, in the spool valve in response to reciprocation of the valve core. The valve core is easily removed from its housing for cleaning by opening a quick release coupling and manually pulling the core from the cylindrical housing.

10 Claims, 1 Drawing Sheet

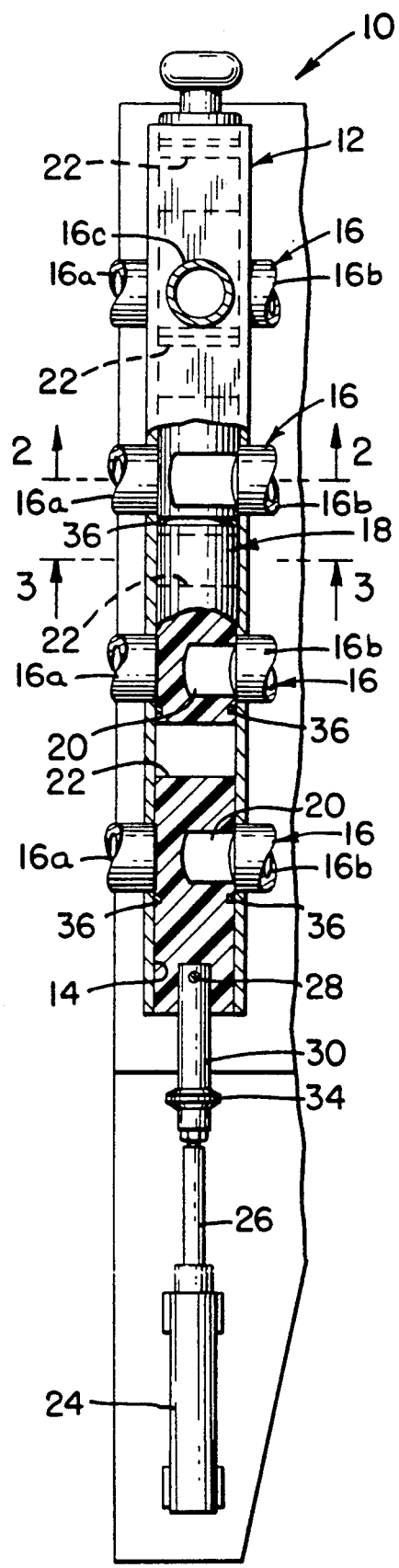
FIG_1
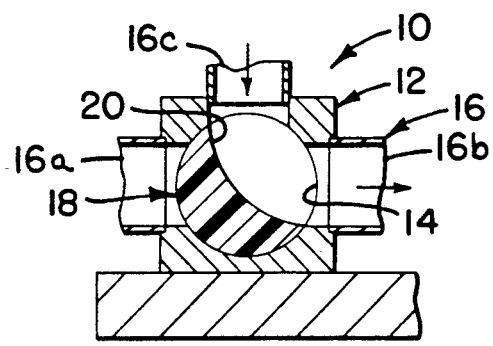
FIG_2
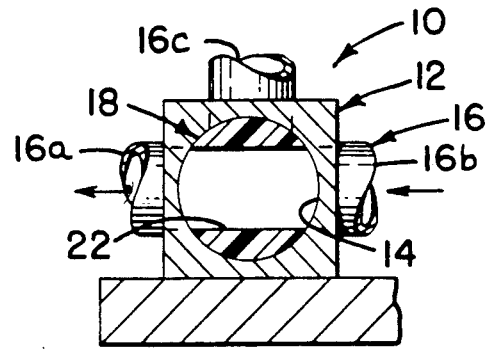
FIG_3

FILLER SPOOL VALVE

FIELD OF THE INVENTION

The present invention relates to a single, quick acting valve which includes an open ended housing with a plurality of longitudinally spaced groups of two axially aligned ports, and a third port that is preferably normal to the associated pairs of axially aligned ports. An axially reciprocating valve spool includes a first plurality of equally spaced linear openings through the spool, and a second plurality of equally spaced groups of arcuate slots in the spool for transferring a flowable product through ports at right angles to each other.

CROSS REFERENCE TO RELATED APPLICATIONS

The present invention relates to the following application filed on even date herewith and entitled VOLUME ADJUSTMENT DEVICE FOR A FILLER, Ser. No. 07/611,230 filed on Nov. 9, 1990.

SUMMARY OF THE INVENTION

A filler spool valve is disclosed having an open ended valve housing with at least one, but preferably a plurality of groups of planar aligned ports, each group having two axially aligned ports and a single port perpendicular to the associated axial aligned ports. A valve core has a plurality of linear passages, and a plurality of arcuate passages therein. The valve core is reciprocated between a first position wherein all linear passages become aligned with associated pairs of axially aligned ports in the valve housing, and a second position wherein all arcuate passages become aligned with associated ones of the associated single ports.

BRIEF DESCRIPTION OF THE DRAWINGS

FIG. 1 is a plan view with parts cut away illustrating the open ended valve housing and valve core, and further illustrating four arcuate passages in the core in positions to direct a flowable fluid therethrough at an angle of about 90° through the valve housing and valve core.

FIG. 2 is a section taken along lines 2—2 of FIG. 1

FIG. 3 is a section taken along lines 3—3 of FIG. 1 illustrating the valve core axially shifted to a second position in alignment with one of a pair of planar aligned ports for allowing a flowable product to flow linearly through the valve housing and its core.

DESCRIPTION OF THE PREFERRED EMBODIMENT

The filler spool valve 10 (FIGS. 1-3) of the present invention includes an open ended elongated housing 12 preferably of stainless steel, having an elongated cylindrical passage 14 therein. A plurality of equally spaced groups of three inlet/outlet passages 16 are evenly spaced from each other as illustrated in FIG. 1. Two inlet/outlet passages 16a and 16b of each group 16 are axially aligned while a third passage 16c is perpendicular to the associated passages 16a and 16b.

The spool valve 10 also includes an elongated core 18, preferably formed from plastic, having a plurality of evenly spaced arcuate slots 20 (FIGS. 1 and 2) therein.

The valve core 18 also has a plurality of evenly spaced linear passages 22, which linear passages and arcuate slots are alternately moved into alignment with associated ones of the inlet/outlet passages 16a, 16b and associated ones of the arcuate slots 20 by an air cylinder 24 having a piston rod 26 therein which is removably connected to the valve core 18 by a pin 28, and a stub shaft 30. The stub shaft is coupled to the piston rod 26 of the air cylinder by a conventional quick release coupling 34. A plurality of O-rings 36 are fitted into annular slots in the valve core 18 to prevent leakage of the fluid, or flowable product, between the valve core and the inner surface of the valve housing.

In operation, a flowable product is directed into the third or inlet passage 16c when aligned with the arcuate slots 20 which cause the flowable product to flow through conduit 16b to a product measuring cylinder or conduit (not shown) which allows input flow and reverse flow of the flowable product. The valve core 18 is then moved by the air cylinder 24 thereby moving the arcuate slots 20 away from the conduits 16a, 16b and, move the linear passages 22 into alignment with the passages 16a and 16b thus allowing the flowable product in conduit 16b to flow from conduit 16b through the associated linear passages 22 and out of the associated passages 16a.

The filler spool valve provides special design features which include:

A. larger ports or passages in the valve core 18 and the open ended housing 12 allow faster and smoother product flow and less product damage;

B. using air cylinders provides quick action between modes of operation which shortens the reaction time, thereby allowing extra time during the filling cycle and/or providing higher cycles per minute;

C. easy and quick disassembly for easy cleaning and assembly;

D. fewer parts and less wear;

E. better seals to prevent leaks and provide higher accuracy;

F. no overlapping of ports thereby insuring no unwanted cross flow of product.

From the foregoing description it is apparent that the filler spool valve of the present invention provides a valve core which is reciprocated, rather than rotated in an open ended housing, and which includes equally spaced arcuate and linear passages therein which provide faster product flow and faster fill thereby providing higher cycles per minute.

Although the best mode contemplated for carrying out the present invention has been herein shown and described, it will be apparent that modification and variation may be made without departing from what is regarded to be the subject matter of the invention.

What is claimed is:

1. A filler spool valve, comprising:
   an open ended housing having an elongated cylindrical passage extending therethrough;
   means defining a plurality of evenly spaced inlet/outlet axially aligned passages in said housing communicating with said cylindrical passage;
   means defining a plurality of evenly spaced third passages in said housing normal to and communicating with said elongated cylindrical passage;
   means defining a valve core slidably received within said open ended housing and sealed in fluid tight engagement to said housing;
   means defining a plurality of large evenly spaced arcuate slots in said valve core;
   means defining a plurality of evenly spaced linear passages extending transversely through said valve core and longitudinally spaced equal distances from associated ones of said arcuate slots; and power means connected to said valve core for alternately shifting said valve core longitudinally between a position wherein said plurality of evenly spaced arcuate slots establishes fluid flow communication between a portion of said plurality of evenly spaced inlet/outlet passages and said associated third passages, and a second position wherein said plurality of evenly spaced linear passages establish fluid flow communication with said associated plurality of evenly spaced inlet/outlet passages.

2. An apparatus according to claim 1 wherein said valve core is formed from a plastic.

3. An apparatus according to claim 1 wherein said plurality of evenly spaced inlet/outlet axially aligned passages are included in said open ended housing, and wherein said power means alternately move said valve core means between positions for alternately aligning said arcuate slots and said linear passages with said associated inlet/outlet axially aligned passages.

4. An apparatus according to claim 1 wherein said power means is a pneumatic actuator which provides quick action thereby shortening reaction time and allowing extra time for fluid flow through large evenly spaced arcuate slots and linear passages in said valve core, said plurality of evenly spaced arcuate slots and said plurality of evenly spaced linear passageways defining large passageways for providing faster and smoother product flow and less product damage.

5. An apparatus according to claim 3 wherein said plurality of evenly spaced inlet/outlet axially aligned passages are spaced apart a sufficient distance for preventing unwanted cross flow of a flowable product.

6. An apparatus according to claim 1 and additionally comprising a quick release coupling connecting said power means to one end of said valve core, and a knob on the other end of said valve core for allowing an operator to quickly manually grip said knob and remove said valve from said open ended housing for cleaning said housing and said valve core.

7. A spool valve, comprising:
an open ended housing having an elongated cylindrical passage generated about a first axis;

means defining a plurality of equally spaced first transverse passages extending through said housing and each having a central axis;

means defining a plurality of equally spaced second transversely extending passages extending through one wall of said housing and having a central axis which intercepts said central axis of a corresponding first transversely extending axis;

an elongated valve core slidably received in said housing and having a plurality of equally spaced arcuate slots therein and a plurality of equally spaced linear passages therein;

means defining O-ring seals on opposite sides of said pairs of said first and second transversely extending passages; and power means for reciprocating said valve core between a first position wherein said arcuate slots are aligned with associated ones of said second transversely extending passages, and thereafter with associated ones of said linear passages in said valve core.

8. A valve core as an article of manufacture comprising:
an elongated cylindrical valve body;
means defining a plurality of evenly spaced arcuate passages in said valve body each having a radius of curvature greater than that of said cylindrical body; and
means defining an equal number of linear passages extending radially through said body and spaced the same distance from each other as said arcuate passages.

9. A valve core as an article of manufacture comprising:
an elongated cylindrical valve body;
means defining a plurality of evenly spaced passages in said valve body;
means defining an equal number of linear passages extending radially through said body and spaced the same distance rom each other as said arcuate passages; and wherein said valve core is formed from plastic, and includes a knob on one end and annular O-ring slots on each side of adjacent pairs of arcuate slots and linear passages in said core.

10. An apparatus according to 1 wherein said means defining a valve core includes annular O-ring slots on each side of adjacent pairs of said arcuate slots and linear passages in said core, and an annular O-ring in each of said O-ring slots.

* * * * *